United States Patent [19]

Hesson et al.

[11] Patent Number: 5,884,061

[45] Date of Patent: *Mar. 16, 1999

[54] APPARATUS TO PERFORM SOURCE OPERAND DEPENDENCY ANALYSIS PERFORM REGISTER RENAMING AND PROVIDE RAPID PIPELINE RECOVERY FOR A MICROPROCESSOR CAPABLE OF ISSUING AND EXECUTING MULTIPLE INSTRUCTIONS OUT-OF-ORDER IN A SINGLE PROCESSOR CYCLE

[75] Inventors: James Henry Hesson; Jay LeBlanc; Stephen J. Ciavaglia; Walter Thomas Esling; Pamela Anne Wilcox, all of Chittenden County, Vt.

[73] Assignee: International Business Machines Corporation, Armonk, N.Y.

[*] Notice: The term of this patent shall not extend beyond the expiration date of Pat. No. 5,625,789.

[21] Appl. No.: 797,392

[22] Filed: May 1, 1995

Related U.S. Application Data

[62] Division of Ser. No. 328,184, Oct. 24, 1994, Pat. No. 5,625,789.

[51] Int. Cl.⁶ ....................................................... G06F 9/34
[52] U.S. Cl. ............................................................. 395/393
[58] Field of Search ..................................... 395/393, 394, 395/392

[56] References Cited

U.S. PATENT DOCUMENTS

| | | | |
|---|---|---|---|
| 4,722,049 | 1/1988 | Lahti | 395/800.03 |
| 4,992,938 | 2/1991 | Cocke et al. | 395/393 |
| 5,446,912 | 8/1995 | Colwell et al. | 395/393 |
| 5,481,683 | 1/1996 | Karim | 395/393 |
| 5,499,352 | 3/1996 | Clift et al. | 395/393 |

*Primary Examiner*—Thomas C. Lee
*Assistant Examiner*—Gautam R. Patel
*Attorney, Agent, or Firm*—Whitham, Curtis & Whitham Tiffany Townsend

[57] ABSTRACT

An apparatus performs source operand dependency analysis, perform register renaming and provide rapid pipeline recovery for a microprocessor capable of issuing and executing multiple instructions out-of-order in a single machine cycle. The apparatus first provides an enhanced means for rapid pipeline recovery due to a mispredicted branch or other store/load conflict or unsupported store/load forward circumstances. Second, the apparatus provides an improved instruction scheduling means wherein the oldest instructions that have all of their dependencies resolved are executed first. Third, the apparatus provides a means for enabling any execution or memory access instruction to execute out-of-order. Fourth, the apparatus provides a means for handling precise recovery of interrupts when processing instructions in out-of-order sequence.

4 Claims, 6 Drawing Sheets

5,884,061

APPARATUS TO PERFORM SOURCE OPERAND DEPENDENCY ANALYSIS PERFORM REGISTER RENAMING AND PROVIDE RAPID PIPELINE RECOVERY FOR A MICROPROCESSOR CAPABLE OF ISSUING AND EXECUTING MULTIPLE INSTRUCTIONS OUT-OF-ORDER IN A SINGLE PROCESSOR CYCLE

This application is a divisional of application Ser. No. 08/328,181 filed Oct. 24, 1994, now issued as U.S. Pat. No. 5,625,789.

CROSS-REFERENCE TO RELATED APPLICATION

The subject matter of this application is related to that of patent application Ser. No. 08/328,185, now abandoned, herewith by J. Hesson et al. for Apparatus to Dynamically Control the Out-of-Order Execution of Load/Store Instructions in a Processor Capable of Issuing and Executing Multiple Instructions in a Single Processor Cycle and assigned to a common assignee. Said application Ser. No. 08/328,185 has been abandoned in favor of continuation application Ser. No. 08/563,859 filed Dec. 1, 1995, now issued as U.S. Pat. No. 5,625,789. The disclosure of application Ser. No. 08/328,185, now abandoned, incorporated herein by reference.

DESCRIPTION

BACKGROUND OF THE INVENTION

1. Field of the Invention

The present invention generally relates to the control of instructions to a pipelined processor of a stored program data processing machine and, more particularly, to an apparatus for controlling the instruction dispatch, issue, execution and pipeline recovery in a microprocessor capable of executing multiple instructions out-of-order every machine clock cycle.

2. Description of the Prior Art

High performance microprocessors are relying on hardware performed dependency analysis and register renaming to facilitate the out-of-order execution of multiple instructions per machine cycle. Representative prior art in this field is the work by John Cocke et al., as described in U.S. Pat. No. 4,992,938, and the work by R. N. Rechtschaffen, as described in U.S. Pat. No. 4,574,349. In particular, Cocke et al. disclose a control mechanism for allowing parallelism among floating point operations by overlapping loads and stores with other instructions. The correct sequence of results is maintained by register renaming; that is, by removing the final assignment of architected registers to physical registers. Rechtschaffen discloses a processor complex wherein a greater number of instruction addressable hardware registers are provided in a central processing unit (CPU) than can be identified by register addressing fields of a program instruction. Rechtschaffen provides a pointer assignment mechanism which assigns unique pointer values to hardware registers, although the same general purpose register (GPR) may be identified in address fields of subsequent load instructions.

SUMMARY OF THE INVENTION

It is an object of the present invention to provide an apparatus to perform source operand dependency analysis, perform register renaming and provide rapid pipeline recovery for a microprocessor capable of issuing and executing multiple instructions out-of-order in a single machine cycle.

According to the present invention, the prior art is extended by first providing an enhanced means for rapid pipeline recovery due to a mispredicted branch or other store/load conflict or unsupported store/load forward circumstances, second, providing an improved instruction scheduling means wherein the oldest instructions that have all of their dependencies resolved are executed first, third, providing a means for enabling any execution or memory access instruction to execute out-of-order and fourth, providing a means for handling precise recovery of interrupts when processing instructions in out-of-order sequence.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
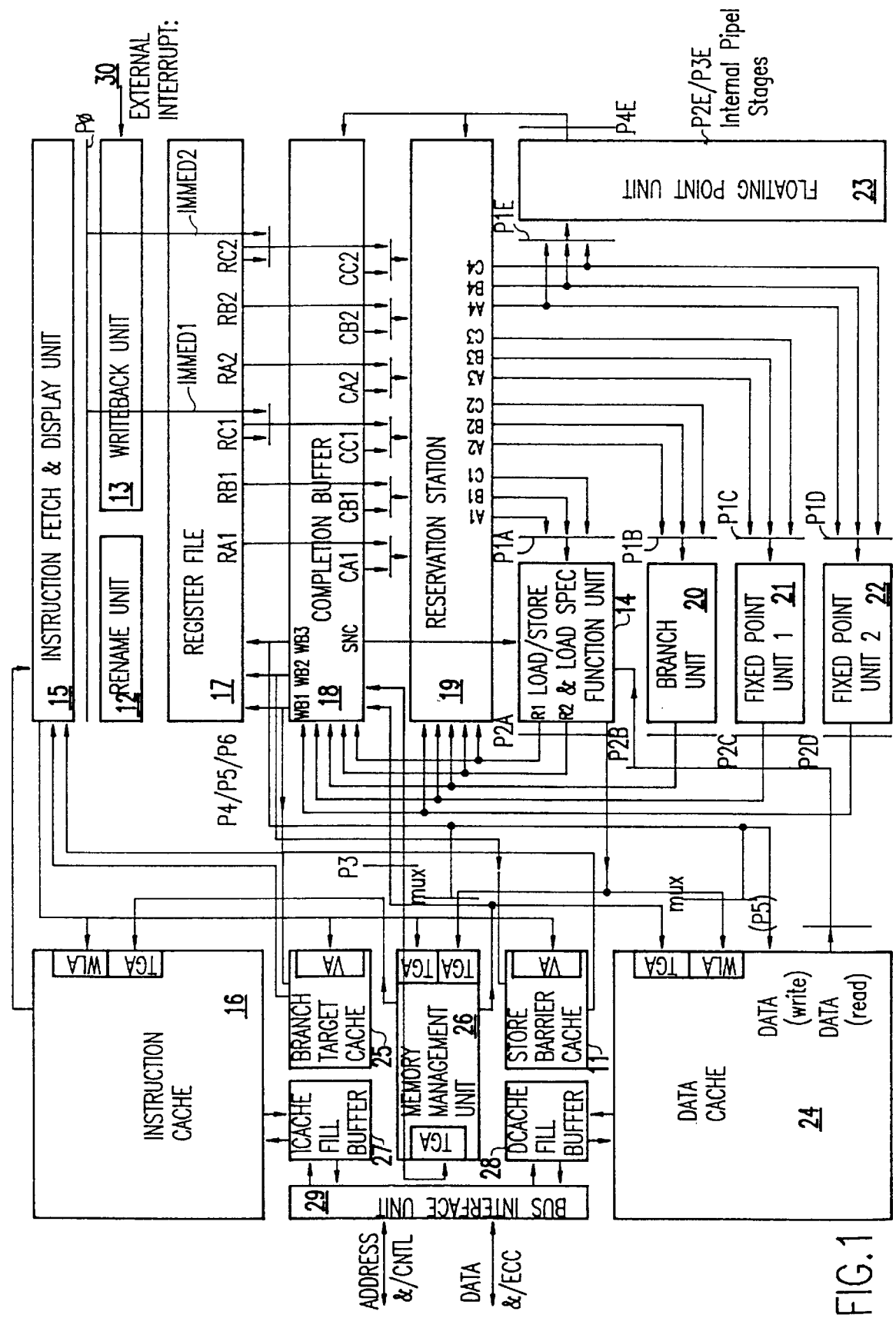
FIG. 1 is a block diagram of a superscaler microarchitecture that incorporates the unique rename cam as well as other functional units typical of a superscaler processor.

Referring now to the drawings, and more particularly to FIG. 1, there is shown a typical superscaler processor that includes a bus interface unit 29 which communicates with a system bus (not shown) to receive and transmit address and control codes and to receive and transmit data and error correcting codes (ECC) or byte parity information. The program instructions are buffered by instruction cache (ICACHE) fill buffer 27 and input to the instruction cache 16. The program data are buffered by data cache (DCACHE) fill buffer 28 and input to the data cache 24. Memory management unit (MMU) 26 controls the writing to and reading out of instructions and data, respectively, for both the instruction cache 16 and the data cache 24.

The superscalar microarchitecture further contains multiple fixed point execution units 21 and 22, a dedicated branch processor 20, a dedicated load/store unit 14, and a floating point unit 23. Instructions are fetched from the instruction cache 16 to the instruction fetch and dispatch unit 15 under the control of the rename unit 12 and dispatched to a central pool of reservation station buffers 19. During the dispatch of instructions from the instruction fetch buffer dispatch window, the destination result field of the instruction is renamed, and the most recent copy of the source operands are either tagged or supplied along with any instruction control bits to the reservation station entry identified by the rename tag. The execution units 14, 20, 21, 22 and 23 are directed by the rename unit 12 to perform the oldest instruction that has each of its operands valid from one of the four reservation read ports P1A, P1B, P1C, or P1D. The four reservation read ports are sourced to the execution units from the central pool of reservation station buffers 19, and the execution units direct the computed results to the completion buffer 18 entry pointed to by the destination tag assigned by the rename unit 12. As reservation station buffers 19 and completion buffer 18 entries are assigned in pairs during the dispatch stage by the rename unit 12, they share the same tag. The writeback unit 13 writes the computed results from the completion buffer 18 back to the architected register or to memory in program order under the direction of the rename unit 12. In the case of the branch execution unit 20, the computed result is written from the completion buffer 18 to the branch target cache 25 which is accessed by the instruction fetch and dispatch unit 15.

The pipelined stages for each of the major type of machine instructions is illustrated in FIG. 1. For example, the data store operation consists of six stages: instruction fetch, instruction dispatch, address generation (i.e., execution stage), memory translation lookaside buffer (TLB) and cache hit/miss search, completion (i.e., write cache and TLB results to completion buffer), and finally writeback to cache.

| Data Store Instruction | | Data Load Instruction | |
|---|---|---|---|
| P0 | Instruction Fetch | P0 | Instruction Fetch |
| P1 | Dispatch | P1 | Dispatch |
| P2 | Address Generation | P2 | Address Generation |
| P3 | Memory Table Search | P3 | Memory Read |
| P4 | Complete | P4 | Complete |
| P5 | Writeback (to DCACHE) | P5 | Writeback (RF) |
| Fixed Point Instruction | | Floating Point Instruction | |
| P0 | Instruction Fetch | P0 | Instruction Fetch |
| P1 | Dispatch | P1 | Dispatch |
| P2 | Execute | P2 | Execute 1 |
| P3 | Complete | P3 | Execute 2 |
| P4 | Writeback | P4 | Execute 3 |
| | | P5 | Complete |
| | | P6 | Writeback |

In the foregoing table, the numbers with the prefix "P" designate stages in the pipeline. Thus the P0 pipeline stage is the instruction fetch stage, the P1 pipeline stage is the dispatch stage, and so forth.

The store barrier cache 11, works in conjunction with instruction fetch and dispatch unit 15, the rename unit 12, the load/store and load special function unit 14 and the writeback unit 13 to obtain a significant performance advantage over prior art by permitting speculative execution of load and store instructions. The store barrier cache 11 is accessed in parallel with the instruction cache 16 and contains history bits that are used to predict the condition wherein a load instruction has executed ahead of a store instruction in program order and that the load and store instruction have the same real address. If the store barrier cache 11 predicts a store load conflict, this information is used during the dispatch of the store instruction to mark a barrier bit within the rename unit 12 so that no loads in program order are permitted to execute ahead of the store that is predicted to be violated. In this fashion, aggressive out-of-order instruction execution is enabled with the accompanying performance advantages.

The register file 17 is in general partitioned into an integer register file and a floating point register file. As shown in FIG. 1, the register file 17 is a unified register file, this being done to simplify the discussion. It is an obvious extension to consider multiple register files. For that matter, the same is true for the completion buffer 18 and reservation station files 19. That is, although the completion buffer and reservation station files are shown in FIG. 1 as unified files, they could be partitioned about each function unit according to integer or floating point data. These extensions are immediately obvious to those skilled in the art of superscalar processor design. The register file 17 of FIG. 1 has six read ports designated as RA1, RB1, RC1, RA2, RB2, and RC2. The read ports RA1, RB1 and RC1 correspond to the first instruction within the instruction dispatch window, while the ports RA2, RB2 and RC2 correspond to the second instruction in the dispatch window. The three write ports to the register file are sourced from the completion buffer 18 with one or more of them being active at any given clock cycle according to the number of result operands that are being written back to the register file 17 during the last stage of an instruction pipeline stage. For the single cycle fixed point instructions, this is during the P4 pipeline stage. For the multiple cycle floating point instructions, this is during the P6 pipeline stage. And for the data load type instructions, this is during the P5 pipeline stage.

FIG. 1 illustrates the major data paths for a representative microarchitecture. The reservation station, completion buffer and register file read and write port addresses and control are not shown in FIG. 1. However, it is obvious that for each read and write port of the reservation station, completion buffer and register file, there corresponds port address and control. This port address and control for each file is generated by the rename unit 12 with the algorithm specified in the pseudocode below. The pseudocode describes the rename unit role in generating port address and control as an instruction progresses through each of its major pipeline states as described in Table 1 below.

The rename unit 12 is used to control the dispatch of instructions from the instruction fetch buffer 15, the issue of instructions to one of the functional units 14, 20, 21, 22, and 23, and the writeback of instructions from the completion buffer 18 back to either the architected registers or memory. The rename unit apparatus shown in FIG. 2 operates as a rotating stack structure that consists of multiple registers 30 through 37 and multiple logic blocks 40 through 47 and by design maintains a record of program order with the least recently used (LRU) or oldest instruction at the top and the most recently used (MRU) or newest instruction at the bottom of the stack. Each of the logic blocks 40 through 47 contain priority encoder logic, execution state scoreboard logic and rename tags.

Figure 2:
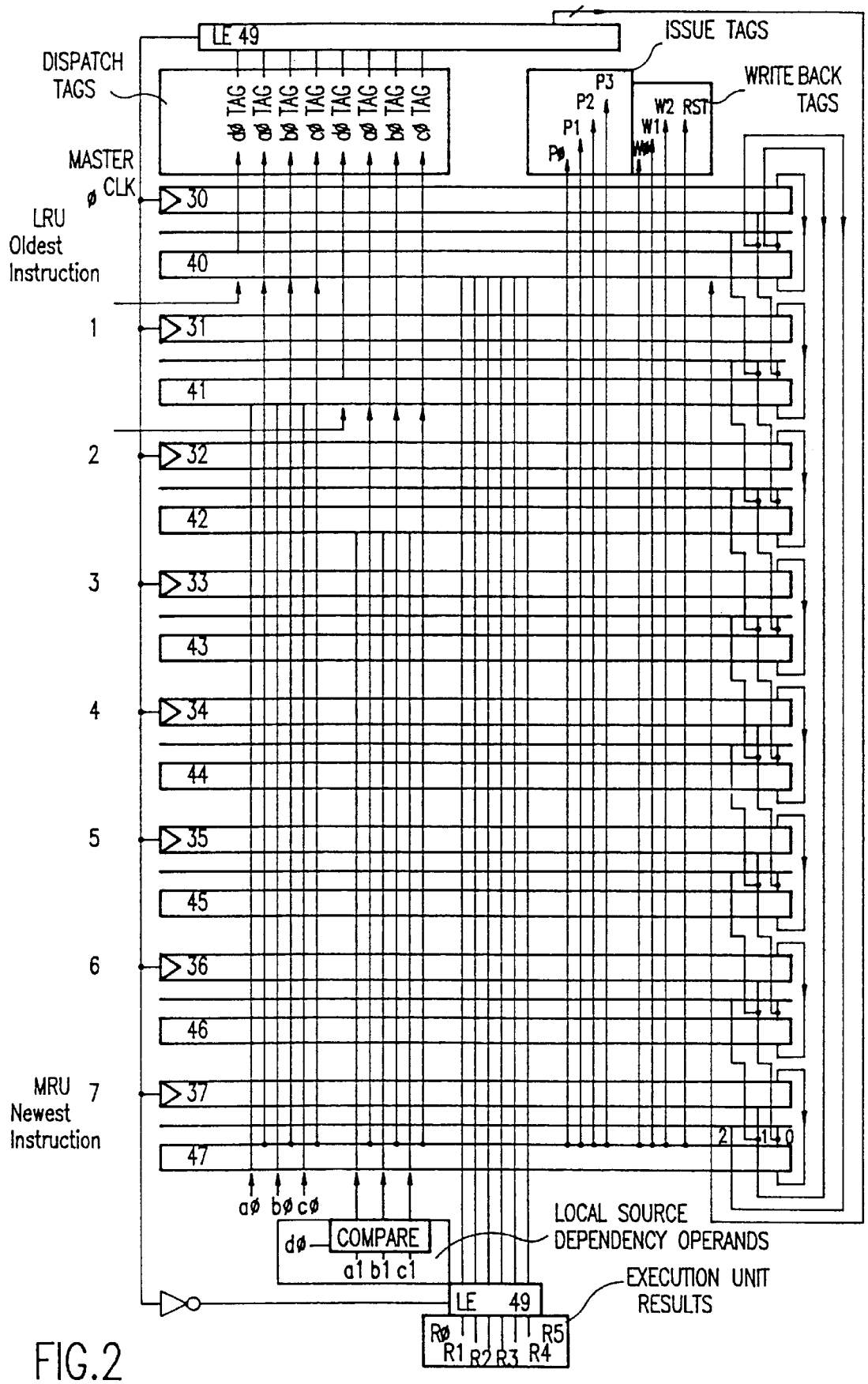
FIG. 2 is a block diagram of a rename unit that is used to perform register renaming, support register dependency analysis, control the execution of instructions and the writeback of the computed results and facilitate the rapid pipeline recovery from a mispredicted branch instruction stream or a precise interrupt.

FIG. 2 illustrates the rename unit structure with a total of eight rename register entries, although greater or fewer entries are obvious extensions of the basic concept. Rename tags are allocated from the free list of rename tags in circular order, and the rename unit rotates according to the number of rename tags that are assigned. The rename unit simply produces the register file, reservation station and completion buffer read and write port address tags corresponding to each of the execution unit pipeline stages as an instruction progresses from dispatch, to issue, through execution and is finally written back. Dispatch tags are generated that correspond to both the local and global source operand dependency analysis and are grouped in register 58 in FIG. 2. Similarly, instruction issue tags are set in latches 59, and writeback tags are set in latches 61. Instruction execution unit result tags as well as any status and or exception condition information is written to the rename unit as the instructions complete. These are temporarily stored in register 60 in FIG. 2.

An execution unit state scoreboard, Table 1, is maintained for each entry with the rename unit and is used to identify each state of instruction execution as the instruction progresses from dispatch through writeback. The one hot encoding of the execution state scoreboard as indicated in Table 1 is not necessary but is an effective means to speed up the priority encode operations dictated by source operand dependency analysis and instruction issue and writeback. Rename unit sources are read during the phase 0 of the master clock. The source tags are sampled by the latch 48 on phase 0. Result tags and state information are gated by the latch 49 on phase 1 of the master clock and the result data the tag data update the rename unit during phase 1 with the rotation performed on the next master clock rising edge. The operation in FIG. 2 is shown as a combination of phase 0, phase 1 and edge triggered operation; however, other equivalent clocking strategies are obvious to those skilled in the art. For example, one such strategy is a self-timed clocking approach.

TABLE 1

EXECUTION UNIT STATE SCOREBOARD

| execution unit state scoreboard | s4 | s3 | s2 | s1 | s0 |
|---|---|---|---|---|---|
| completed and available rename | 0 | 0 | 0 | 0 | 1 |
| renamed but not available for issue | 0 | 0 | 0 | 1 | 0 |
| fully available for issue | 0 | 0 | 1 | 0 | 0 |
| issued but not completed | 0 | 1 | 0 | 0 | 0 |
| completed and available for writeback | 1 | 0 | 0 | 0 | 0 |

Dispatch priority encoders are used to provide the most recent rename tag for the architected source register dependency analysis. Instruction issue priority encoders are also used to identify the reservation station entry that contains the oldest instruction that has all of its source dependencies resolved and is to be launched next. One issue priority encoder is used for each of the four function unit ports P1A to P1D shown in FIG. 1. Lastly, writeback priority encoders are used to identify the completion buffer entry that contains the next completed instruction that is to be written back. Again, one writeback priority encoder is applied for writeback unit port and write back of completed instructions is performed in program order. Each of the priority encoders are fixed with respect to the LRU to MRU stack position and are furthermore set up to provide either least recent rename tag or most recent rename tag entry as required by their specific application. The execution state scoreboard is updated as a conventional state machine according to a prescribed set of conditions based upon previous state and new events. However, unlike a conventional state machine, its state varies according to the rotation of the rename unit. Update of the execution unit state scoreboard is accomplished by matching the result rename tag against the same tag within the rename unit and updating the execution unit scoreboard accordingly.

The rename unit 12 maintains a record of program order although instructions issue and execute out-of-order. As mentioned above, the micro architecture is capable of speculatively executing multiple instructions including load and store instructions out-of-order. In order to realize the significant performance advantage of this aggressive execution model, it is necessary to be able to recover from a mispredicted branch or other store load conflict condition rapidly without loss of any valid completed instructions. The key to rapid recovery is the rename unit's program order stack structure which permits an instantaneous partial flush of the invalid rename tags and dispatch along the correct instruction stream.

Rapid pipeline recovery via a partial flush of the contents of the rename unit is achieved by forcing a rename unit entry to state 0, completed and available for rename. This can be necessitated as a result of a mispredicted branch or a store-load conflict. Depending on a particular implementation, external interrupts may also force a partial flush if it is desired to have the shortest possible interrupt latency at the expense of wiping out valid results which in all likelihood will have to be reproduced after the interrupt service routine has completed.

The logic necessary to implement the pseudocode describing the preferred method in Table 2 can take the form of a programmable logic array (PLA) whose execution unit state scoreboard is rotated by the multiplexers 50 through 57 of FIG. 2 according to the number of instructions that are dispatched in a given cycle. Table 2 describes in detail the requirements for execution unit state scoreboard state transitions in terms of "IF THEN ELSE" rules which by themselves are sufficient to drive a logic synthesis tool.

The priority encoder logic is used to provide the oldest or newest tag result from the rename unit according to the direction of the priority search. Priority encoder logic and also the construction of the PLA is well known to those skilled in the art, and for this reason it is not described in detail.

Table 2 summarizes the pseudo code for instruction dispatch, instruction issue and instruction writeback.

TABLE 2

RENAME UNIT PSEUDO CODE FOR INSTRUCTION
DISPATCH, ISSUE AND WRITEBACK defination of frequently used terms:

rf = register file
rs = reservation station
cb = completion buffer
src = source
learn = rename content addressable memory (rename unit)
instr = instruction
pgm = program The Current Dispatch Window is defined as the two oldest instructions in the instruction fetch and dispatch buffer 15 (FIG. 1). I0 is the oldest instruction and I1 is the next instruction in program order new than I0. I0 produces a result which is written to rd0 and has source operands a0, b0 and c0. Similarly, the I1 instruction produces a result which is written to the register file location specified by rd1 and operates on the source operands specified by the register identification fields a1, b1 and c1.

I0: opcode d0, a0, b0, c0
I1: opcode d1, a1, b1, c1

The dependency analysis performed on the current dispatch window is defined as the local source operand dependency analysis. The dependency analysis performed, in which the source operands arise from instructions previously dispatched, is referred to as global source operand dependency analysis.

In the following description, the pseudocode for the rename unit 12 is illustrated in the flow diagram shown in FIGS. 3A to 3D. The flow diagram uses the convention of diamond shaped boxes to indicate a decision (or test) operation, corresponding to an IF statement in the pseudocode, and rectangular shaped boxes to indicate a function (or action) operation, corresponding to the THEN and ELSE statements in the pseudocode. The pseudocode is itself annotated with comments between *//* delimiters. These comments are for the most part the reference characters in the boxes of the drawing figures. The connections between figures are indicated by alpha characters in circles, as is conventional in flow diagrams.

Figure 3A:
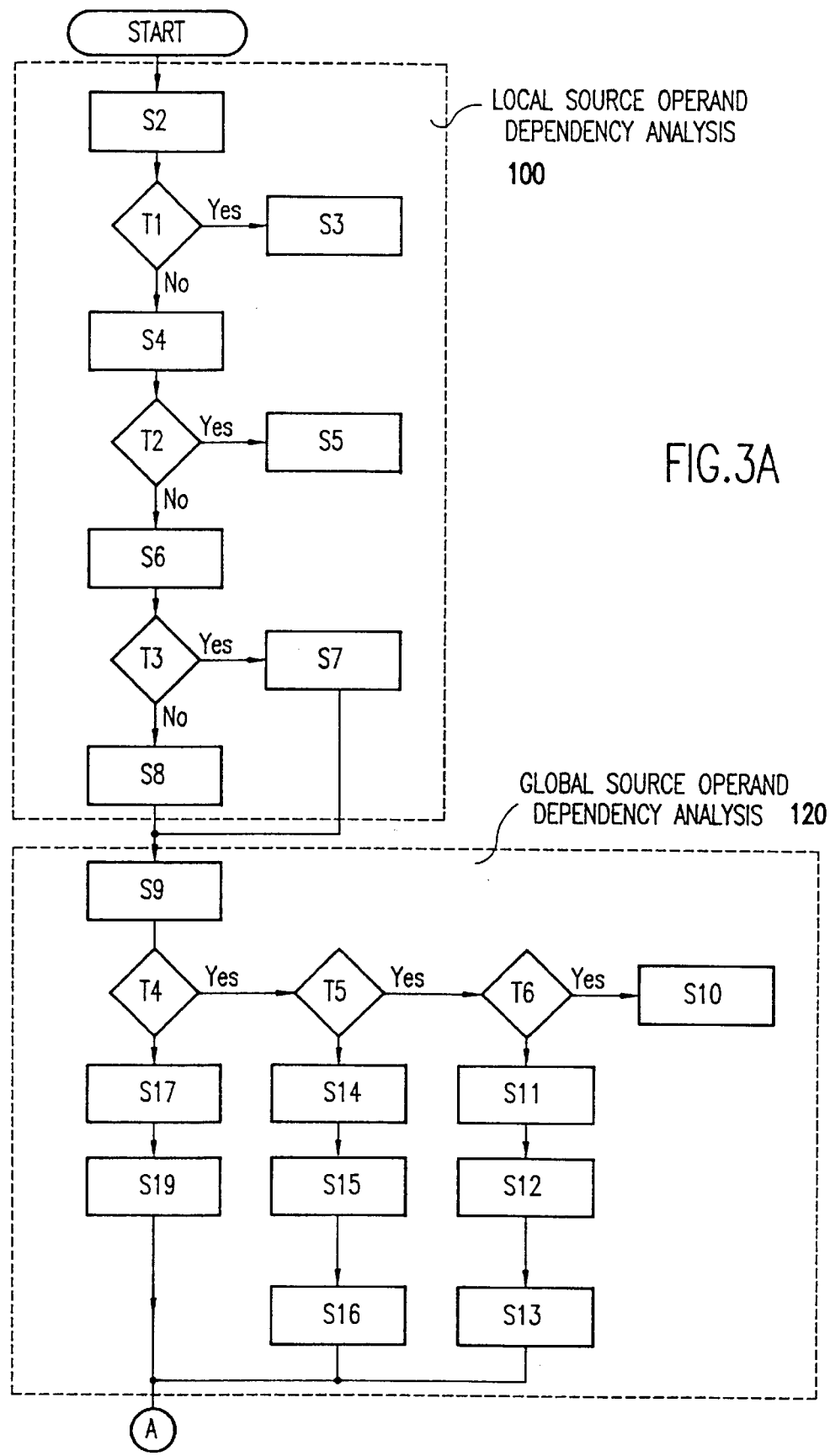
FIGS. 3A to 3D, taken together, are a flow chart showing the logic of the process implemented according to the invention.

The Local Source Operand Dependency Analysis is illustrated at 100 in the flow diagram of FIG. 3A. The pseudocode, with references to the flow diagram, is as follows:

I1 source dependencies on I0 destination, d0: */S2/*
if {a1–d0} */T1/*
then {assign a1 tag to d0 tag} */S3/*
else {assign a1 tag from global source operand dependency analysis on the register field b1} */S4/*
if {b1–d0} */T2/*
then {assign b1 tag to d0 tag} */S5/*
else {assign b1 tag from global source operand dependency analysis on the register field b1}*/S6/*
if {c1=d0} */T3/*
then {assign c1 tag to d0 tag} */S7/*
else {assign c1 tag from global source operand dependency analysis on the register field c1} */S8/*

The Global Source Operand Dependency Analysis is illustrated at 120 in the flow diagram of FIG. 3A. The pseudocode, with references to the flow diagram, is as follows:
{apply for all source operands for both I0 and I1} */S9/*
if {source operand is an indexed instr format form, i.e. rf src} */T4/*
then
    if {roam source operand match} */T5/*
    then
        if {result in completed state} */T6/*
            then {source from completion buffer and mark valid} */S10/*
            else {required operand result is tagged but not complete} */S11/*
                {source will update when complete via a match of the mru tag and the corresponding result when complete} */S12/*
                {mark operand invalid and tag with roam mru tag} */S13/*
        else {roam source operand miss} */S14/*
            {a1 source operand is valid and available from the rf} */S15/*
            {source operand from rf using rf if field & write rs and mark operand as valid} */S16/*
        else {a1 source is an immediate} */S17/*
            {mark source operand valid and write immediate to rs} */S18/*

Figure 3B:
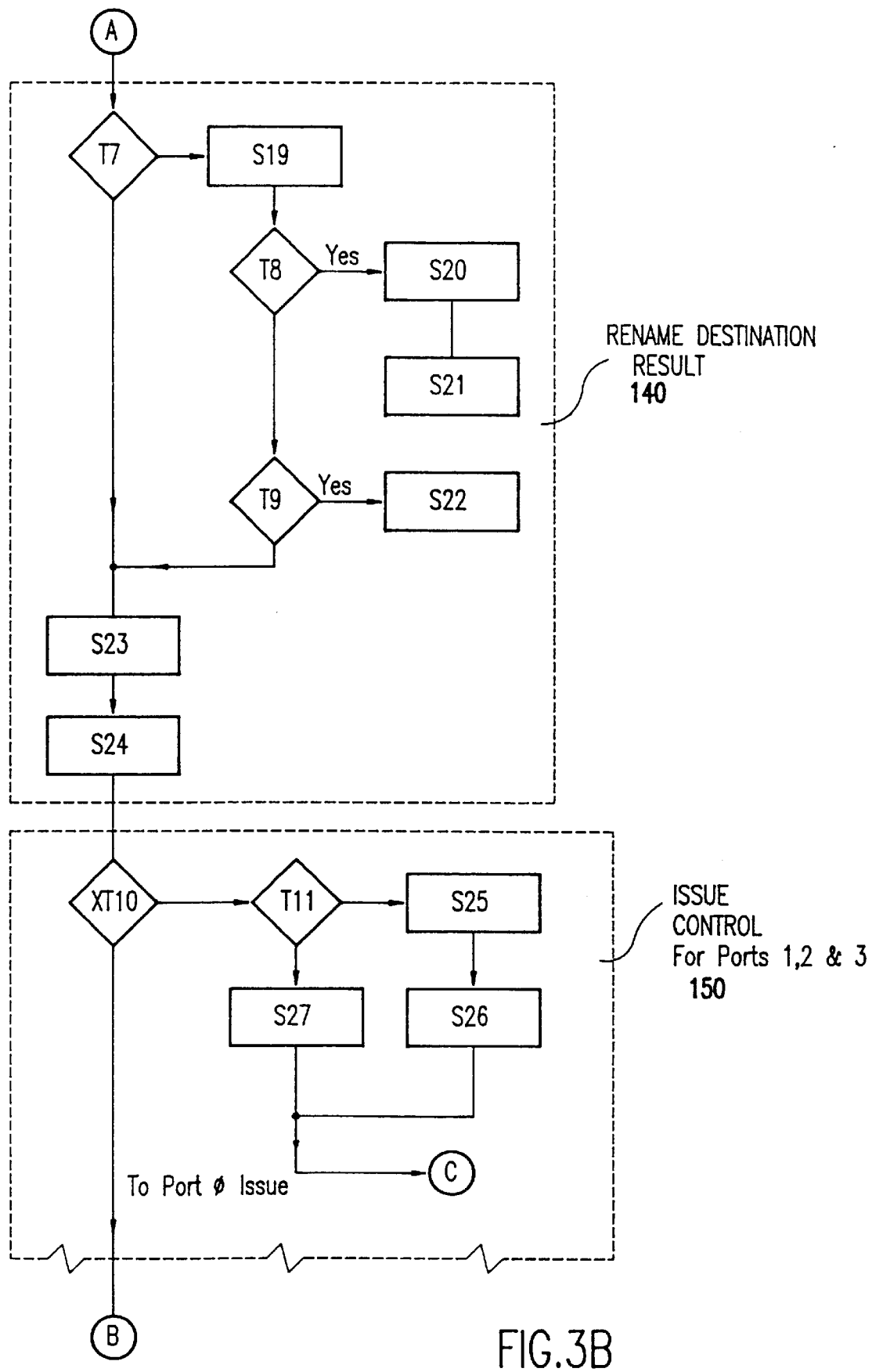

The Rename Destination Result is illustrated at 140 in the flow diagram of FIG. 3B. The pseudocode, with references to the flow diagram, is as follows:
if {available rs/cb entries} */T7/*
then {determine number of available entries} */S19/*
    if {there are two or more rs/cb entries} */T8/*
        then {assign mru tag & function unit & serialization info & load/store info to I0 location then rotate roam by 2} */S20/*
            {assign second mru tag & function unit & serialization info & load/store info to I1 then rotate roam by 2} */21/*
if {there is one rs/cb entry} */T9/*
then {assign mru tag & function unit & serialization info & load/store info to I0 location then rotate roam by 1} */S22/*
else {there are no rs/cb entries available} */S23/*
{do not allocate (write) any new entries and do not rotate roam} */S24/*

Figure 3C:
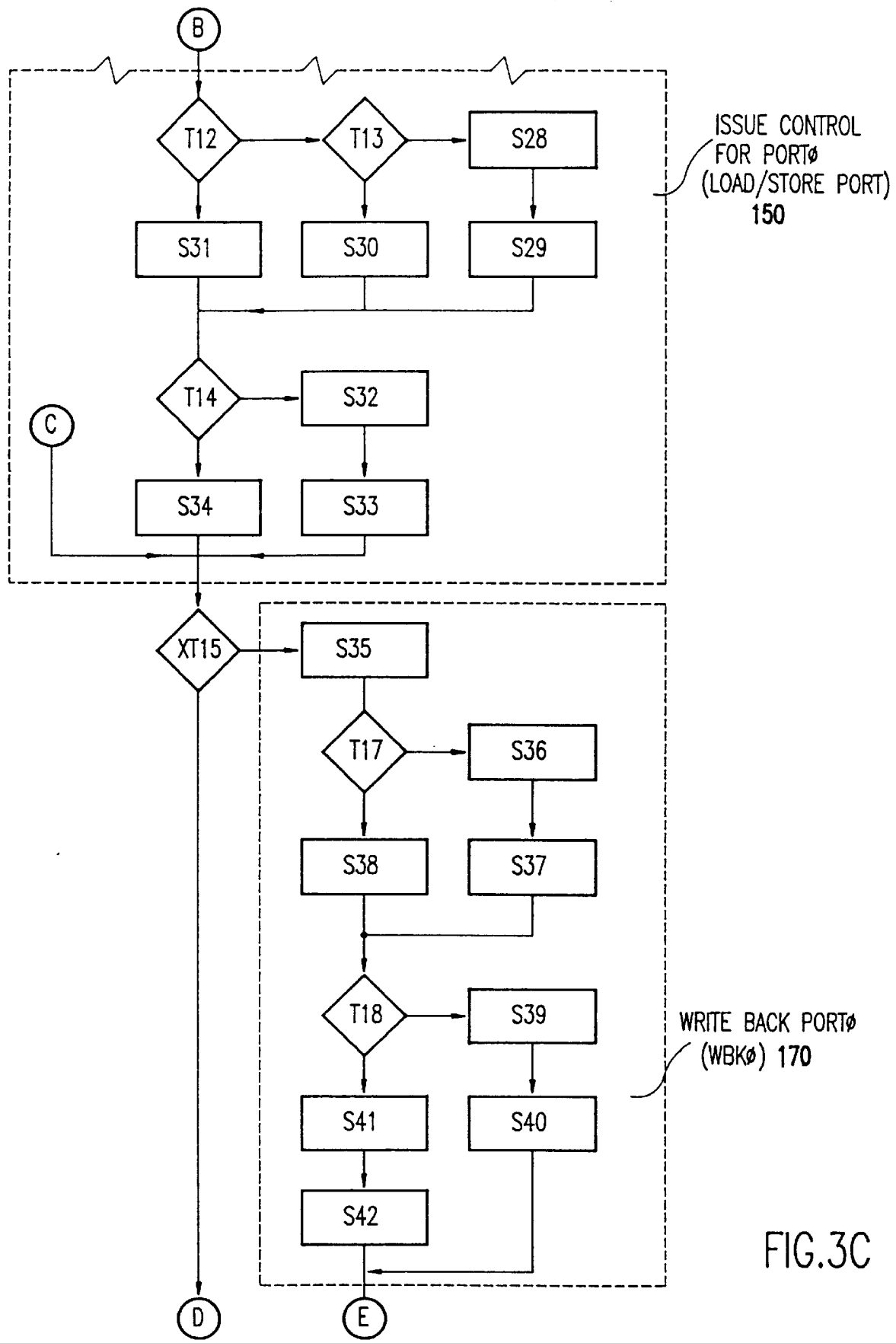

The issue instruction to functional unit from ports 0–3 is illustrated at 150 in the flow diagrams of FIG. 3B and 3C. The pseudocode, with references to the flow diagram, as follows:

ports {1 or 2 or 3}: */XT10 in FIG. 3B/*
if {state 2} {oldest instr on port x w/ valid ops} {no execute or no writeback serialization control bits set in older pgm order}
or {state 0} {all source operands valid during dispatch} {no execute or no writeback serialization control bits set in older pgm order} */T11/*
then {issue to port x} */S25/*
    {update execution unit state scoreboard at end of cycle} */S26/*
else {hold issue} */S27/*
port {0}: */FIG. 3C/*
if {load instruction} */T12/*
then
    if {state 2} {oldest instr on port x w/ valid ops} {no execute or no writeback serialization control bits set in older pgm order or no store barrier bit set or no unsupported st/ld frwd bit set}
    or {state 0} {all source operands valid during dispatch} {no execute or no writeback serialization control bits set in older pgm order or no store barrier bit set or no unsupported st/ld frwd bit set} */13/*
    then {issue to port x} */S28/*
        {update execution unit state scoreboard at end of cycle} */S29/*
    else {hold issue} */S30/*
else {store instruction case} */S31/*
if {state 2} {oldest instr on port x w/ valid ops} {no execute or no writeback serialization control bits set in older pgm order}
or {state 0} {all source operands valid during dispatch} {no execute or no writeback serialization control bits set in older pgm order} */T14/*
then {issue to port x} */S32/*
{update execution unit state scoreboard at end of cycle} */S33/*
else {hold issue} */S34/*

Figure 3D:
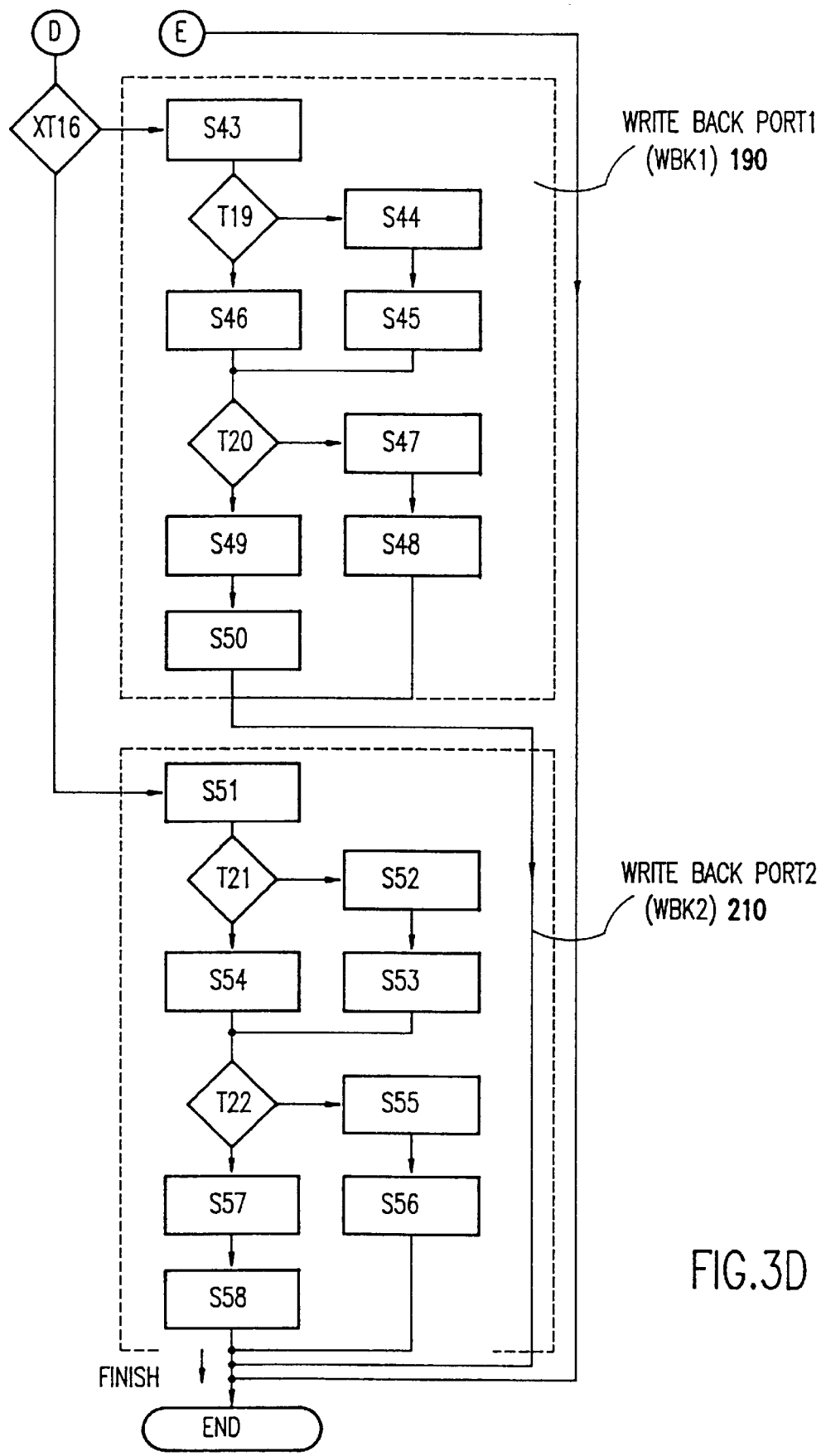

The writeback completed instruction to and from writeback ports wbk0–wbk2 is illustrated at 170 in the flow diagram of FIG. 3C and at 190 and 210 in the flow diagram of FIG. 3D. The pseudocode, with references to the flow diagram, is as follows:
writeback port 0: (wbk0) */XT15/* in FIG. 3C/*
{wbk0 port produces oldest instruction completed and available for writeback} */S35/*
if {writeback to register file} */T17/*
    then {writeback next cycle is guaranteed} */S36/*
        {update execution unit state scoreboard at end of cycle} */S37/*
    else {writeback to cache must be arbitrated} */S38/*
        if {request to writeback granted} */T18/*
            then {writeback to cache} */S39/*
                {update execution unit state scoreboard at end of cycle} */S40/*
            else {try again next cycle, hold off all instructions newer in program order than current instruction, i.e. wbk1–2} */S41/*
                {update execution unit state scoreboard at end of cycle} */S42/*
writeback port 1: (wbk1) */XT16 in FIG. 3D/*
{wbk1 port produces next oldest instruction completed and available for writeback after wbk0} */S43/*
if {writeback to register file} */T19/*
    then {writeback next cycle is guaranteed} */S44/*
        {update execution unit state scoreboard at end of cycle} */S45/*

```
    else {writeback to cache must be arbitrated} */S46/*
if {request to writeback granted} */T20/*
    then {writeback to cache} */S47/*
        {update execution unit state scoreboard at end of cycle}
            */S48/*
    else {try again next cycle, hold off all instructions newer
        in program order than current instruction, i.e. wbk2}
        */S49/*
        {update execution unit state scoreboard at end of cycle}
            */S50/*
writeback port 2: (wbk2)
{wbk2 port produces next oldest instruction completed and
    available for writeback after wbk1} */S51/*
if {writeback to register file} */T21/*
    then {writeback next cycle is guaranteed} */S52/*
        {update execution unit state scoreboard at end of cycle}
            */S53/*
    else {writeback to cache must be arbitrated} */S54/*
        if {request to writeback granted} */T22/*
            then {writeback to cache} */S55/*
                {update execution unit state scoreboard at end of
                    cycle} */S53/*
            else {try again next cycle, hold off all instructions
                newer in program order than current instruction}
                */S57/*
                {update execution unit state scoreboard at end of
                    cycle} */S58/*
```

While the invention has been described in terms of a single preferred embodiment, those skilled in the art will recognize that the invention can be practiced with modification within the spirit an scope of the appended claims.

Having thus described our invention, what we claim as new and desire to secure by Letters Patent is as follows:

1. A method of performing register renaming and rapid pipeline recovery in a pipelined microprocessor capable of issuing and executing instructions out-of-order in a single processor cycle comprising the steps of;

temporarily storing program data and instructions to be executed;

performing source operand dependency analysis;

assigning rename tags to source operands which are yet to be calculated by prior instructions and supplying retiring tagged data in place of matching previously tagged source operands;

providing instruction scheduling wherein oldest executable instructions are executed first by a plurality of execution units;

dispatching executable instructions to a plurality of execution units and supplying the execution units with operands from the stored program data and previously tagged data;

enabling any execution or memory access instruction to execute out-of-order; and temporarily storing operand results including tagged data to be retired from the execution units.

2. The method of performing register renaming and rapid pipeline recovery according to claim 1 wherein the step of assigning rename tags further comprises:

allocating rename tags from a list of rename tags in circular order; and storing the rename tags in the rotating stack.

3. The method of performing register renaming and rapid pipeline recovery according to claim 2 wherein the step of temporarily storing program data and instructions further comprises:

identifying one previously stored instruction as an oldest unexecuted instruction; and marking all instructions older than said oldest unexecuted instruction as being flushed.

4. The method of performing register renaming and rapid pipeline recovery according to claim 2 wherein the step of providing rapid pipeline recovery comprises partially flushing the rotating stack.

\* \* \* \* \*

UNITED STATES PATENT AND TRADEMARK OFFICE
CERTIFICATE OF CORRECTION

PATENT NO. : 5,884,061
DATED : March 16, 1999
INVENTOR(S) : James Henry Hesson et al.

It is certified that error appears in the above-identified patent and that said Letters Patent is hereby corrected as shown below:

On column 1, line 11, delete "08/328,181" and insert --08/328,184--.

Signed and Sealed this

Seventh Day of December, 1999

Attest:

Q. TODD DICKINSON

*Attesting Officer*   *Acting Commissioner of Patents and Trademarks*